US005272405A

United States Patent [19]

Terada

[11] Patent Number: 5,272,405

[45] Date of Patent: Dec. 21, 1993

[54] COMMUTATOR

[75] Inventor: Yuichi Terada, Hamamatsu, Japan

[73] Assignee: Asmo Co., Ltd., Shizuoka, Japan

[21] Appl. No.: 921,646

[22] Filed: Jul. 30, 1992

Related U.S. Application Data

[62] Division of Ser. No. 720,667, Jun. 25, 1991, Pat. No. 5,153,979.

[30] Foreign Application Priority Data

Jun. 26, 1990 [JP] Japan ................................ 2-168062

[51] Int. Cl.[5] ............................................ H02K 13/04

[52] U.S. Cl. ...................................... 310/236; 310/42; 310/43; 310/45; 310/235

[58] Field of Search ............... 310/233, 234, 235, 236, 310/42, 43, 45, 220, 221; 29/597; 228/258

[56] References Cited

U.S. PATENT DOCUMENTS

| | | | |
|---|---|---|---|
| 3,302,281 | 2/1967 | Freeman | 228/258 |
| 3,423,819 | 1/1969 | Carlson et al. . | |
| 3,958,326 | 5/1976 | Matsumoto et al. . | |
| 4,833,769 | 5/1989 | Tomite | 310/235 |
| 5,122,975 | 6/1992 | Luciani | 310/234 |
| 5,153,979 | 10/1992 | Terada | 29/597 |

OTHER PUBLICATIONS

Japanese Patent Application Laid-Open No. 63-265548, published Nov. 2, 1988.

Japanese Patent Application Laid-Open No. 63-265549, published Nov. 2, 1988.

*Primary Examiner*—R. Skudy

*Attorney, Agent, or Firm*—Venable, Baetjer, Howard & Civiletti

[57] ABSTRACT

A plate-like material is rounded in the form of a cylinder so as to form a main body of a commutator to which an end of a winding for an armature coil of an electric motor is electrically connected, and both ends of the plate-like material are opposed to each other so as to define a joint portion therebetween. When a molten soldering material is introduced into the joint portion and solidified therein, the joint point is closed by the soldering material, thereby making it possible to mold the main body of the commutator, which is shaped substantially in the form of a jointless cylinder. The commutator can be easily fabricated and the manufacturing cost thereof can also be reduced as compared with a case where the main body of the commutator is fabricated from a pipe-shaped material. Since the joint portion can reliably be closed, resin used to charge the inside of the main body of the commutator therewith at a subsequent step can be prevented from extruding toward the outside of the main body.

4 Claims, 7 Drawing Sheets

COMMUTATOR

This is a division of U.S. patent application Ser. No. 720,667, filed Jun. 25, 1991, now U.S. Pat. No. 5,153,979.

BACKGROUND OF THE INVENTION

1. Field of the Invention

The present invention relates to a commutator and a method of manufacturing the same, and particularly to a commutator of a type wherein the inside of a main body thereof shaped substantially in the form of a cylinder and having a joint portion which is defined in a portion of an outer periphery of the main body and discontinues portions thereof adjacent to the joint portion, is charged with resin so as to mold a resin insulator made of the resin; and to a method of manufacturing the commutator.

2. Description of the Related Art

A commutator has a main body made of a metal and shaped in the form of a cylinder. In addition, the inside of the main body thereof is charged with resin so as to mold a resin insulator made of the resin. The thus-molded resin insulator is interposed about the axis of a rotor.

The commutator referred to above has heretofore been manufactured by a method of molding a metal plate in a predetermined form by pressing or the like, followed by rounding (a rounding process), joining both ends of the plate so as to form a cylindrical main body, and then charging the main body with resin so as to form a resin insulator made of the resin.

The method of molding the cylindrical main body from the metal plate (plate-like material) to fabricate the commutator has normally been used because the manufacturing process is easy and the material cost is reduced as compared with a method of molding a main body from a pipe-like material so as to fabricate a commutator.

However, the conventional commutator (main body) shaped in the form of a cylinder by rounding the plate-like material has a joint portion (joint surface) inevitably defined in a part of an outer peripheral wall of the commutator. Therefore, the conventional method has the problem that when the joint portion is charged with resin so as to mold a resin insulator, the resin flows out from the joint portion, thereby producing socalled burrs.

In this case, the resin (i.e., burrs), which flows out from the joint portion produces a cause contributing to occurrence of sparks when windings for an armature coil are electrically connected to claw-shaped connecting portions (segments of a commutator) of the commutator by, for example, resistance welding. It is therefore necessary to establish a special working step for removing all burrs from the resin insulator after the resin insulator is molded, thereby causing poor workability and an increase in the manufacturing cost of the commutator.

SUMMARY OF THE INVENTION

With the foregoing problems in view, it is a principal object of the present invention to provide a commutator of such a type that the inside of a main body thereof is charged with resin so as to mold a resin insulator made of the resin, and the thus molded resin insulator is neither exposed to the outside of a joint portion nor formed with any burr; and to provide a method of fabricating the commutator, which can avoid discharging resin used to charge the inside of the main body therewith from the joint portion, thereby making it possible to prevent any burr from occurring.

A commutator according to the present invention for an electric motor has a main body shaped in a cylindrical form by rounding a flat plate; and the inside of the main body thereof is charged with resin. In addition, an end of a coil winding for the motor is electrically connected to a claw-shaped portion projecting from the main body. Since the main body is shaped in the form of the cylinder by rounding the flat plate, the ends of the flat plate are opposed to each other so as to define a joint portion (jointing gap) therebetween, which is in turn charged with molten soldering material. The joint portion is charged with the soldering material introduced into a joint portion by its own weight or by capillary action. When the soldering material is introduced into the joint portion by capillary action, the joint portion, i.e., a space is sufficiently narrowed so as to cause capillary action. The resin used to charge the inside of the main body therewith after the joint portion is charged with the molten soldering material can be prevented from being exposed to the outside of the main body so as to form burrs because the joint portion is closed by the soldering material. In addition, the resin referred to above no longer produces a cause contributing to occurrence of any spark or the like at the time that the resistance welding is carried out at subsequent steps.

If the main body of the commutator is dipped into a plating bath for holding therein the molten soldering material and the molten soldering material is introduced into the joint portion by capillary action, then any masking applied to the joint portion is unnecessary and the amount of the soldering material adhering to the joint portion can be reduced by means of simplified equipment.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Figure 1:
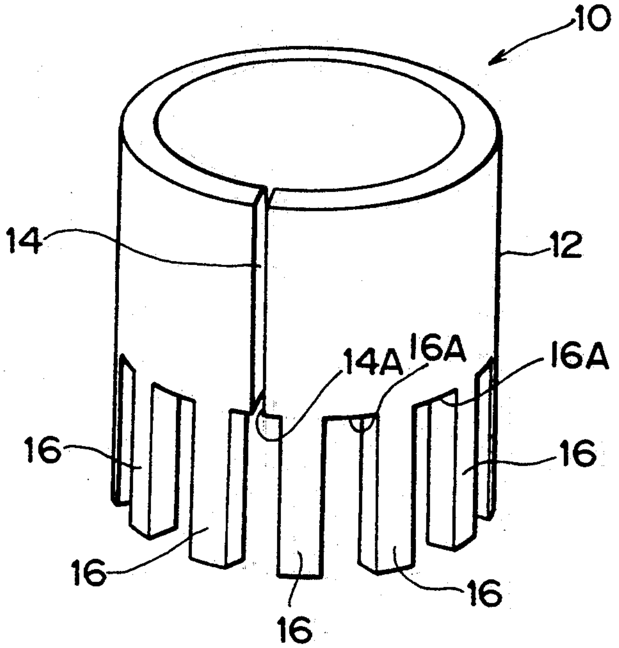
FIG. 1 is a perspective view showing a commutator immediately before it is charged with soldering material and to which a soldering material adhering method according to a first embodiment of the present invention is to be applied.

FIG. 1 is a perspective view showing a commutator 10 immediately before it is charged with soldering material and to which a commutator manufacturing method according to a first embodiment of the present invention is to be applied.

A main body 12 of the commutator 10 is made of a metallic material and shaped substantially in the form of a cylinder (the main body 12 having an outside diameter of, for example, 16 mm). A joint portion (jointing gap) 14 which discontinues portions adjacent thereto is defined in a part of the outer periphery of the commutator 10 along the axial dimension thereof. Thus, the cylindrical inside of the main body 12 communicates with the outside through the joint portion 14.

The commutator 10 has around the entire circumference of one end thereof a plurality of claw-shaped connecting portions 16 extending along the axis dimension thereof in parallel with each other and at equal intervals. The ends of these claw-shaped connecting potions are shaped in the form of hooks, and windings (to be explained later) for an armature coil are electrically connected thereto.

Figure 3:
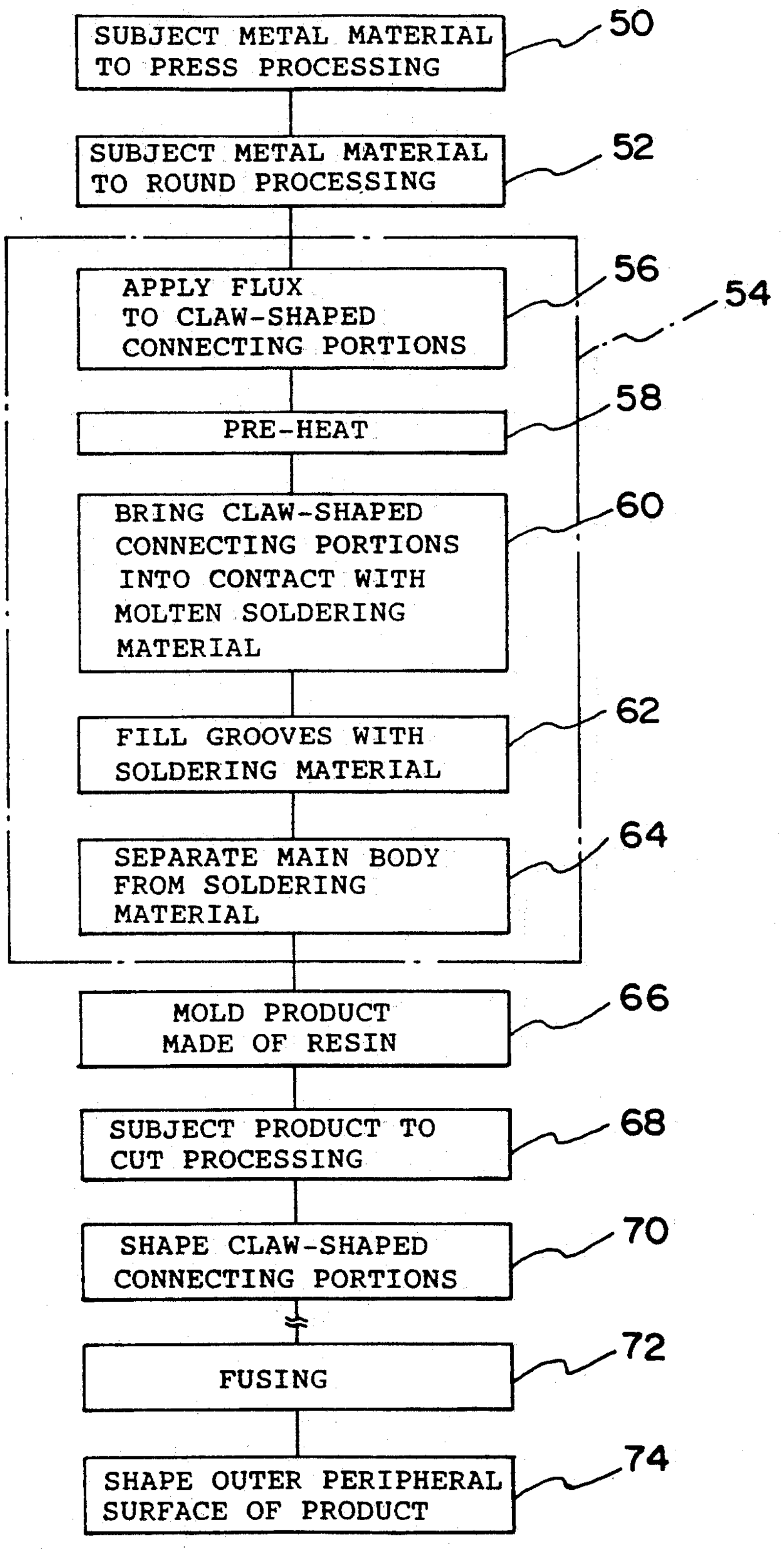
FIG. 3 is a flowchart describing each step of the procedure for manufacturing a commutator.

The procedure for fabricating the commutator 10 will now be described in accordance with the commutator production steps shown in FIG. 3.

Figures 4A, 4B, 4C, 4D, 4E:
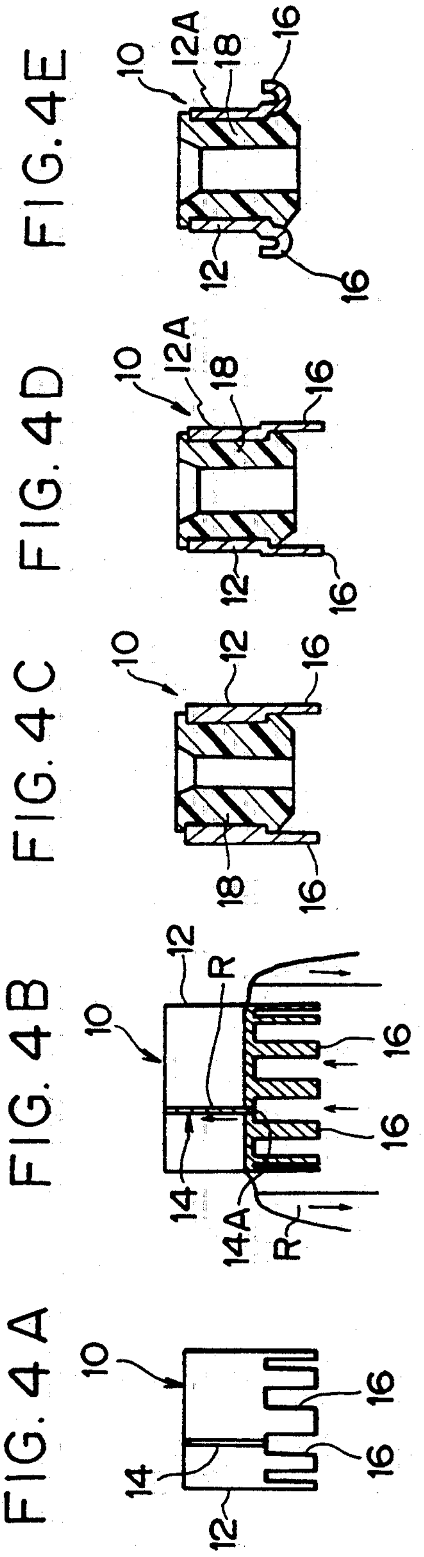
FIGS. 4(A) through 4(E) are schematic views of different commutators corresponding to their respective sequences of manufacturing steps.

In Step 50, a metal material is first molded by pressing or the like so as to produce the basic shape of the commutator 10 (main body 12) including the respective claw-shaped connecting portions 16. Further, in Step 52, the ends of the plate-like metal material is subjected to a rounding process in such a manner that they are formed as joint surfaces. As a consequence, the main body 12 can basically be shaped substantially in the form of a cylinder as illustrated in FIGS. 1 and 4(A), and a joint portion 14 is also formed in the commutator 10.

The thus-formed commutator 10 is then subjected to a soldering material charging process in Step 54. More specifically, flux is applied to the respective claw-shaped connecting portions 16 and the joint portion 14 in Step 56, and the main body 12 is preheated in Step 58. As a consequence, the temperature (of the main body) of the commutator 10 is increased and volatile portions in the flux are removed from the flux by evaporation. In Step 60, the claw-shaped connecting portions 16 are then dipped into molten soldering material R, and the edges 14A of the joint portion 14 are brought into contact with the molten soldering material R (see the state illustrated in FIG. 4(B)).

Figure 2:
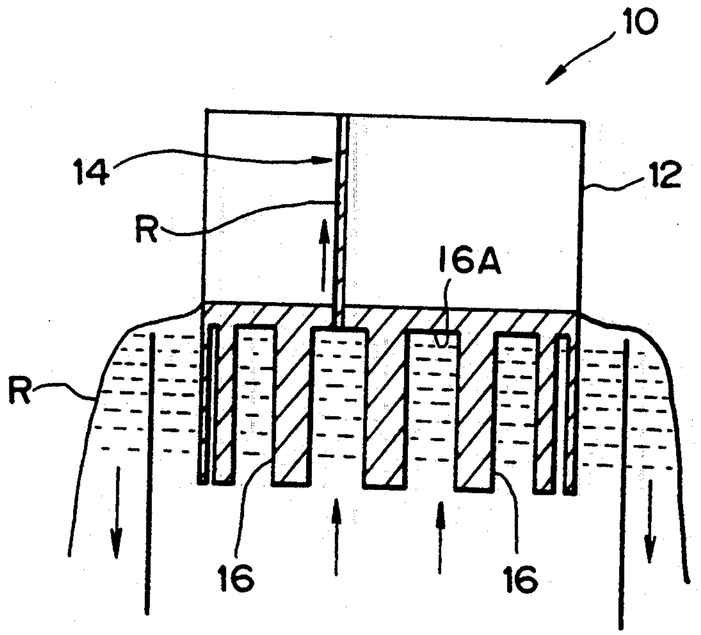
FIG. 2 is a front view of the commutator processed for the charging of the commutator employed in the first embodiment with the soldering material.

When the respective claw-shaped connecting portions 16 are dipped into the molten soldering material R as shown in detail in FIG. 2, the soldering material R is adhered to the respective claw-shaped connecting portions 16. Further, when the edges 14A of the joint portion 14 is also deeply dipped into the molten soldering material R, the temperature of the main body 12 is further increased so as to activate the flux, thereby increasing the surface lubricating action thereof. When the temperature of the joint portion 14 reaches the melting temperature of the soldering material, the soldering material R is elevated toward the joint portion 14 by capillary action. As a consequence, the joint portion 14 is charged with the soldering material R in Step 62.

After the joint portion 14 is filled with the soldering material R, the main body 12 is lifted up and separated from the molten soldering material R in Step 64. Thereafter, the soldering material R in the joint portion 14 is solidified as a result of cooling and hence the joint portion 14 is reliably charged with solid soldering material R. Thus, the joint portion 14 is shielded, i.e., closed by the soldering material R under this state, and the main body 12 is shaped substantially in the form of a jointless cylinder by means of the soldering material R. The process of charging the joint portion 14 with the soldering material R is completed in this way.

After the joint portion 14 is filled with the soldering material R, the routine procedure proceeds to Step 66, and the inside of the main body 12 and base end portions 16A between the adjacent claw-shaped connecting portions 16 are charged with resin, and a resin insulator 18 made of the resin is molded integrally with the commutator 10 with the aid of an unillustrated molding die (see the state shown in FIG. 4(C)).

When the inside of the main body 12 is charged with the resin so as to mold the resin insulator 18, the joint portion 14 is filled with the soldering material R in advance in Step 54 so as to close the joint portion 14, and the main body 12 is shaped substantially in the form of a jointless cylinder by the soldering material R. Therefore, the resin does not flow out from the joint portion 14 even when the joint portion 14 is charged with the resin, thereby causing no burrs. It is therefore unnecessary to prepare a special working step for removing burrs from the resin insulator 18 after the resin insulator 18 is molded, thereby making it possible to improve the workability and to reduce the manufacturing cost of a commutator.

Figure 6:
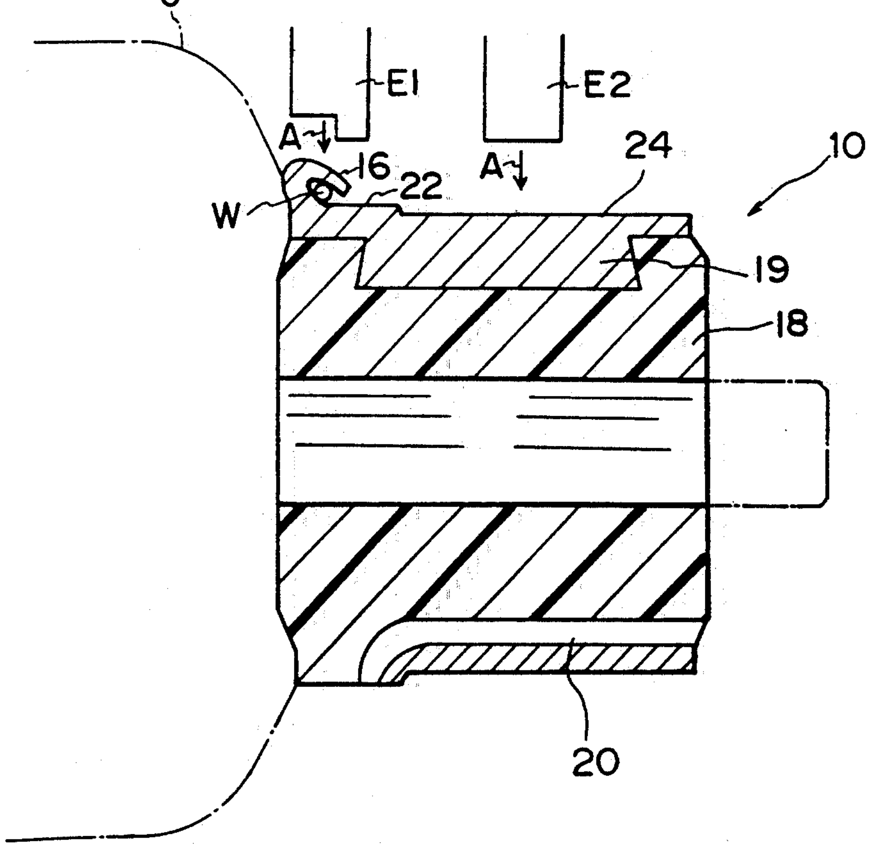
FIG. 6 is a cross-sectional view of the commutator taken along line 6 - 6 of FIG. 5.

Then, the inner peripheral wall of the resin insulator 18 made of the resin and a part of the outer peripheral wall of the main body 12 are subjected to a cutting process in Step 68, thereby forming a smallerdiameter portion 12A of the commutator 10 (see the state illustrated in FIG. 4(D)). Incidentally, as shown in FIG. 6, it is preferable to have molded in advance a trapezoid-shaped projection 19 projecting from a part of the inner periphery of the main body 12 so as to improve the connecting strength between the commutator and the resin insulator 18 made of the resin, by means of the projection 19. Then, in Step 70, each of the claw-shaped connecting portions 16 is subjected to a bending process so as to have a predetermined shape (see the state shown in FIG. 4(E)). After the bending process of the claw-shaped connecting portions 16 have been completed, the respective windings for the armature coil are subjected to an electrical fusing process such as resistance welding or the like for connecting them to the respective claw-shaped connecting portions 16, in Step 72.

When the windings for an armature coil C are electrically connected to the claw-shaped connecting portions 16 as illustrated in FIG. 6, ends W of the windings are wound and mounted on the claw-shaped connecting portions 16, and the soldering material R previously applied to the claw-shaped connecting portions 16 is re-melted by heat produced at the time of the resistance welding through electrodes E1 and E2 that approach the commutator 10 along a path generally depicted in FIG. 6 by the arrows A, so that the whole peripheral surface of the connection where respective windings are electrically connected to the respective claw-shaped connecting portions 16 is covered with the soldering material R, thereby enabling the prevention of subsequent thermal expansion or contraction or an increase in the electrical resistance due to oxidation.

The joint portion 14 may be charged with an amount of the soldering material R, which makes it necessary to simply fill in the joint portion 14.

Figure 5:
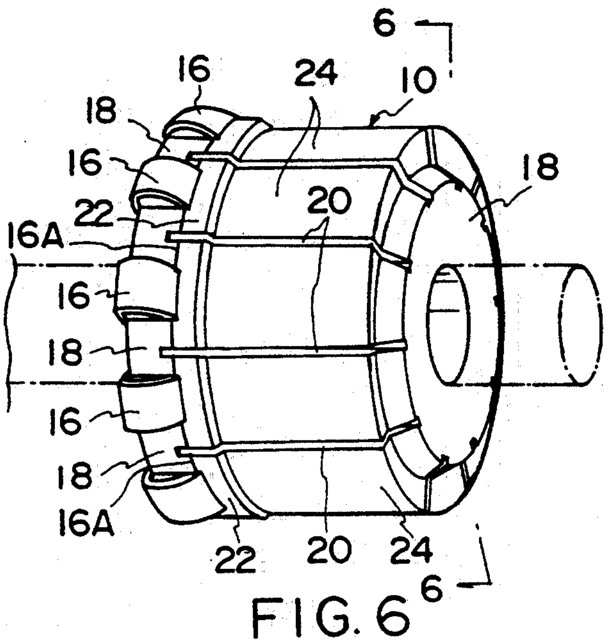
FIG. 5 is a perspective view showing a completed commutator.

As shown in FIGS. 5 and 6, slit-shaped cuts 20 are defined in the commutator and the insulator 18 made of the resin, thereby dividing the commutator and the outer peripheral surface of the insulator 18 in Step 74 into segments so as to insulate respective joined pairs of risers 22 and segments 24 from other joined pairs of risers 22 and segments 24 which are adjacent thereto, thereby completing all the steps.

As described above, the joint portion 14 defined between joint surfaces of the plate-like metal material is charged with the soldering material R so as to close the joint portion 14, so that the main body 12 is shaped substantially in the form of a jointless cylinder by means of the soldering material R. Therefore, when the main body 12 is subsequently charged with molten resin so as to form the resin insulator 18 made of the resin, the resin does not flow out from the joint portion 14, thereby producing no burrs. It is therefore unnecessary to establish a special working step for removing burrs after the resin insulator 18 is molded, thereby making it possible to improve its workability and to reduce the manufacturing cost of a commutator.

Only the joint portion 14 and the claw-shaped connecting portions 16 are charged with the soldering material R, and the soldering material R is not applied to other portions of the main body 12. It is therefore unnecessary to apply any masking or the like to those portions, and the amount of the soldering material R adhered to such portions can be reduced to the minimum amount required. Since the joint portion 14 can be charged with the soldering material R by merely bringing the edges 14A of the joint portion 14 into contact with the molten soldering material R, the provision of facilities for processing acidic waste-liquids or the like is unnecessary, and the process of charging the joint portion 14 with the soldering material can be performed by small and simplified equipment.

Further, the process of charging the joint portion 14 with the soldering material R can be carried out by a step (Step 54) identical to the process of soldering material adhered to the respective claw-shaped connecting portions 16. Therefore, the workability for the process of charging the joint portion 14 with the soldering material R can also be improved.

Other embodiments of the present invention will now be described. Incidentally, elements of structure basically identical to those in the first embodiment will hereinafter be identified by like reference numerals and their description will therefore be omitted.

Figure 7:
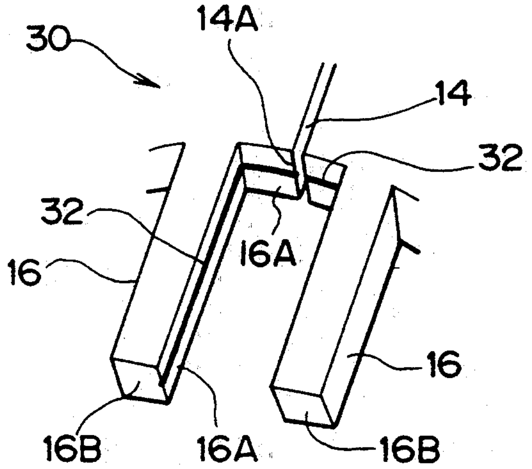
FIG. 7 is an enlarged perspective view showing portions immediately before a joint portion is charged with soldering material, the portions being located near a joint portion of a commutator to which a commutator manufacturing method according to a second embodiment of the present invention is to be applied.

FIG. 7 is a perspective view showing portions immediately before a joint portion 14 is charged with soldering material, the portions being located near the joint portion 14 of a commutator 30 to which a commutator manufacturing method according to a second embodiment of the present invention is to be applied.

The commutator 30 has straight grooves 32 defined in side walls 16A of a pair of claw-shaped connecting portions 16 near the joint portion 14, in parallel to each other and the axial dimension of the commutator 30. Lower edges of the respective grooves 32 extend to edges 16B of the respective claw-shaped connecting portions 16, whereas upper edges thereof extend across base end portions 16A and edges 14A of the joint portion 14, and communicate with the joint portion 14.

Figure 8:
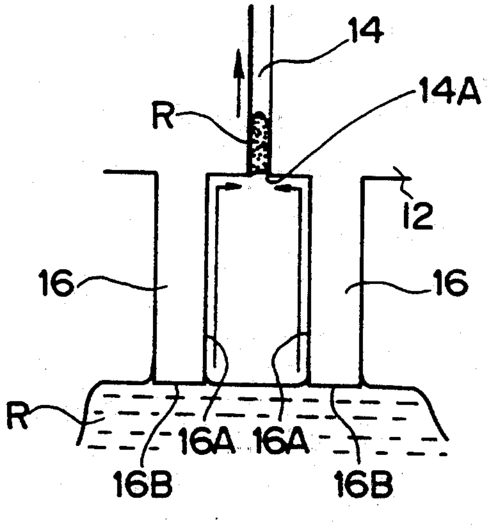
FIG. 8 is a partial front view schematically showing the commutator processed for the charging of the commutator employed in the second embodiment with the soldering material.

In the commutator 30, the joint portion 14 is charged with a soldering material R via the grooves 32. More specifically, after the main body 12 is preheated, the edges 16B of the respective claw-shaped connecting portions 16 are brought into contact with molten soldering material R as shown in FIG. 8. When the respective claw-shaped connecting portions 16 are brought into contact with the molten soldering material R, the temperature of the claw-shaped connecting portions 16 is further increased so as to activate flux, thereby increasing the surface lubricating action thereof. When the temperature of each of the grooves 32 reaches the melting temperature of the soldering material, the soldering material R is elevated toward the grooves 32 by capillary action, and flows into the joint portion 14. As a consequence, the joint portion 14 is filled with the soldering material R.

Thus, even in this case, the joint portion 14 is closed by means of the soldering material R, and the main body 12 is shaped substantially in the form of a jointless cylinder. Therefore, in the present embodiment, as well, when the main body 12 is subsequently charged with resin so as to mold a resin insulator 18 made of the resin, the resin does not flow out from the joint portion 14, thus producing no burrs at the resin insulator 18. In addition, the amount of the soldering material R used to charge the joint portion 14 therewith can be reduced to the minimum amount required.

Since the joint portion 14 can be charged with the soldering material R by merely bringing the edges 16B of the claw-shaped connecting portions 16 into contact with the molten soldering material R, the area of the portion of the molten soldering material R which is brought into contact with air can be greatly reduced, so that the oxidation of the soldering material R can be reduced.

Since the process of charging respective commutators with the soldering material can be simultaneously performed, their workability can be improved and the manufacturing cost of them can also be reduced.

Incidentally, the grooves 32 which are guide portions, are defined singly in the claw-shaped connecting portions 16, respectively, in the second embodiment. However, the present invention is not necessarily limited to the present embodiment. Other grooves which communicate with the joint portion 14 may further be defined. In this case, the charging of the joint portion 14 with the soldering material R can be carried out more rapidly.

Figure 9:
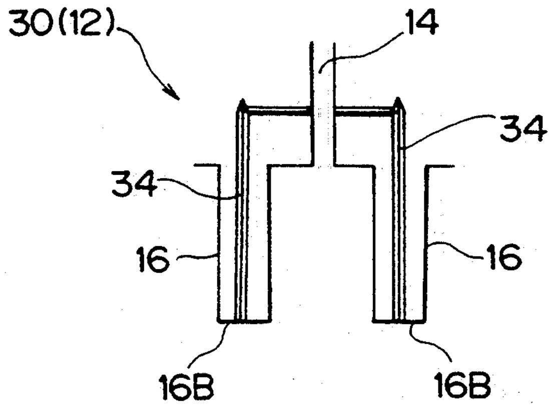
FIG. 9 is a schematic front view showing grooves each defined in an outer periphery of a claw-shaped connecting portion.
Figure 10:
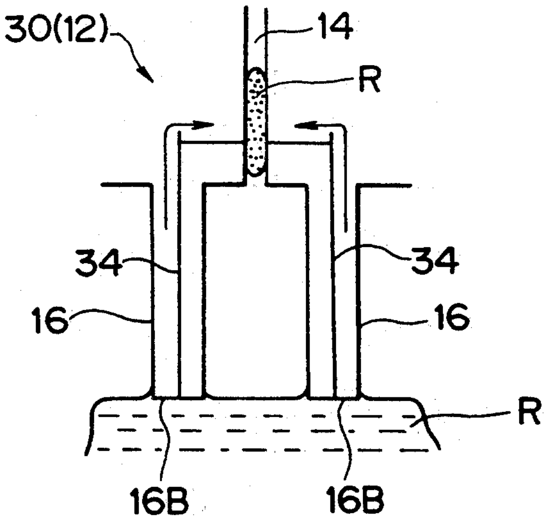
FIG. 10 is a partial front view schematically showing a commutator processed for the charging of the commutator with the soldering material.

In the second embodiment, the grooves 32 are defined only in the side walls 16A of the pair of claw-shaped connecting portions 16 near the joint portion 14. However, grooves 34 which communicate with the edges 16B of the claw-shaped connecting portions 16 and the joint portion 14 may be defined in the outer peripheral surfaces of the claw-shaped connecting portions 16 (main body 12), respectively, as illustrated in FIG. 9. When the edges 16B of the claw-shaped connecting portions 16 are brought into contact with the molten soldering material R as shown in FIG. 10, the soldering material R is successively introduced via the grooves 34 into the joint portion 14 so as to charge the joint portion 14 therewith.

Incidentally, in the first and second embodiments, the molten soldering material R is introduced into the joint portion 14 by capillary action, and the joint portion 14 is charged with the soldering material R. However, the present invention is not necessarily limited to the first and second embodiments. The molten soldering material R may directly flow into the joint portion 14 so as to charge the joint portion 14 therewith.

Figure 11:
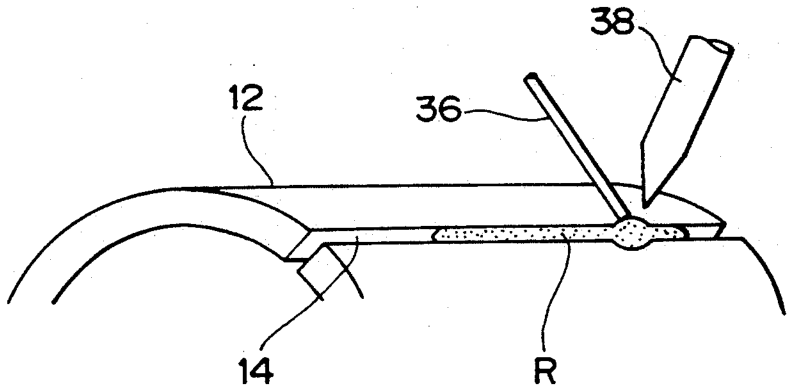
FIG. 11 is a partial perspective view of a commutator to which a commutator manufacturing method according to another embodiment of the present invention is to be applied.

As illustrated in FIG. 11 by way of example, the joint portion 14 is soldered using a wire solder 36 and a soldering iron 38 for example, and molten solder may spread spontaneously so as to charge the joint portion 14 therewith. In this case, as well, the joint portion 14 is closed by the molten solder and the main body 12 is shaped substantially in the form of a jointless cylinder. Thus, the resin does not flow out from the joint portion 14 and any burr is not produced.

Having now fully described the invention, it will be apparent to those skilled in the art that many changes and modifications can be made without departing from the spirit or scope of the invention as set forth herein.

What is claimed is:

1. A commutator suitable for use in an electric motor having coil windings, the commutator comprising:

a main body having a cylindrical shape, a plurality of claw shaped portions extending in a generally axial direction from a surface of said main body, at least one of said claw shaped portions having a guide portion formed therein, and having a joint portion which is defined in a portion of an outer peripheral wall thereof and discontinues said main body;

a molten soldering material used to charge said joint portion therewith, said soldering material serving to fill up said joint portion and to shape said main body into a jointless cylinder, wherein said guide portion is used to introduce said molten soldering material into said joint portion by means of capillary action;

an insulator made of a resin material which is used to at least partially fill the inside of said main body therewith;

wherein said guide portion is a narrow groove defined in at least one of said claw-shaped portions; and said claw-shaped portions are deformable and electrically connectable to at least one end of the coil windings of the electric motor.

2. A commutator according to claim 1, wherein said claw-shaped portions to which ends of respective coil windings for the electric motor are electrically connectable extend integrally from said main body, and said soldering material is adhered to said claw-shaped portions.

3. A commutator according to claim 1, wherein said claw-shaped portions extend plurally from said main body, and said narrow groove is defined in a claw-shaped portion adjacent to said joint portion.

4. A commutator suitable for use in an electric motor, comprising:

a main body having a cylindrical shape and having a joint portion which is defined in a portion of the outer peripheral wall thereof and discontinues said main body, said body having a guide portion formed therein;

a molten soldering material used to charge said joint portion therewith, said soldering material serving to fill up said joint portion and to shape said main body into a generally jointless cylinder by means of capillary action, wherein said guide portion is used to introduce said molten soldering material into said joint portion;

said guide portion including a plurality of narrow grooves, each of which extends to said joint portion; and an insulator made of a resin material which is used to at least partially fill the inside of said main body therewith.

* * * * *